United States Patent Office 3,190,635
Patented June 22, 1965

3,190,635
FLUID PRESSURE DAMPING DEVICES
Ernst Wustenhagen, Koblenz, and Wilfried Ferdinand Roos, Guls (Mosel), Germany, assignors to Stabilus, Industrie- und Handelsgesellschaft m.b.H., Koblenz-Neuendorf, Germany
Filed Jan. 14, 1964, Ser. No. 337,657
1 Claim. (Cl. 267—65)

The invention is based upon the problem of providing a simple and reliable hydraulic or pneumatic or even hydropneumatic damping device, the damping medium of which is under high pressure.

The object of the invention is to facilitate the filling and sealing of the device with high pressure damping medium.

According to the present invention there is provided a fluid pressure damping device, the damping medium of which is under high pressure, comprising a cylinder, a piston, a piston rod attached to the piston and extending through a first wall of the cylinder, an end part extending through a second wall of the cylinder, a flange on the end part within the cylinder, a corresponding annular surface on the said second wall of the cylinder, an elastic sealing ring between the flange and said annular surface, the dimensions of which ring in the untensioned condition leave an annular gap between the outer surface of the ring and the cylinder free for the filling of the damping fluid and which ring after the filling of the damping element closes off the annular gap in pressure-tight fashion by the internal pressure of the damping element alone.

An example of embodiment of a damping element according to the invention is represented in section in the drawing, wherein.

Figure 1:
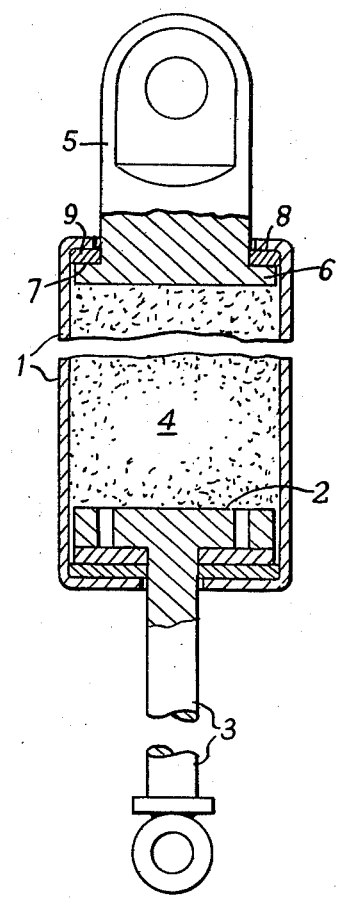
FIGURE 1 shows the damping element filled with the damping medium.

A damping cylinder 1, with which there is associated a damping piston 2 within the cylinder having a piston rod 3 which extends through one end wall of the cylinder. The cylinder is filled with damping medium 4 under high pressure. On the side lying opposite to the damping piston 2 the damping cylinder 1 is closed off by the end part 5, which passes through the other end wall of the cylinder and the end of which extending into the damping space has a collar-like flange 6 having an annular surface 7 which lies opposite to the annular surface 8 of the damping cylinder 1. Between these two annular surfaces there is arranged a sealing ring 9.

Figure 2:
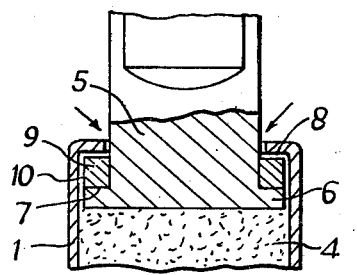
FIGURE 2 shows the position of the end part during the filling.

As may be seen from FIGURE 2, the sealing ring 9 in the untensioned condition leaves an annular gap 10 free, through which the damping medium 4 can be introduced into the damping cylinder 1.

During the filling of the damping cylinder 1 with the damping medium 4 the internal pressure has reached the predetermined level, the pressure from the exterior ceases, so that the sealing ring 9 is clamped fast between the two annular surfaces 7 and 8 as a result of the high internal pressure acting upon the end part 5, and is so deformed that the annular gap 10 is closed in pressure-tight fashion.

In this manner a simple but reliable pressure-tight connection between the damping cylinder 1 and the end part 5 is produced.

The damping fluid may be liquid or gas e.g. an inert gas such as nitrogen. The pressure of this gas may be 50 to 200 atmospheres or may be greater or less in some cases.

The diameter of the holes in the piston in FIGURE 1 is shown (to faciliate drawing) of much greater diameter than will be required in practice.

We claim:

A fluid pressure damping device, the damping medium of which is under high pressure, comprising a cylinder, a piston, a piston rod attached to the piston and extending through a first wall of the cylinder, an end part extending through a second wall of the cylinder, a flange on the end part within the cylinder, a corresponding annular surface on the said second wall of the cylinder, an elastic sealing ring between the flange and the said annular surface, the dimensions of which ring in the untensioned condition leave an annular gap between the outer surface of the ring and the cylinder free for the filling of the damping fluid and which ring after the filling of the damping element permanently closes off the annular gap in pressure-tight fashion by the internal pressure of the damping fluid alone, the device having at least one duct located such as to convey fluid from one end of the piston to the other.

References Cited by the Examiner
UNITED STATES PATENTS 2,708,573   5/55   Rovoldt _____ 267—1
2,881,808   4/59   German _____ 141—20 X

FOREIGN PATENTS 1,132,386   6/62   Germany.

ARTHUR L. LA POINT, Primary Examiner.
EUGENE G. BOTZ, Examiner.